US007638061B2

(12) United States Patent
Moore

(10) Patent No.: US 7,638,061 B2
(45) Date of Patent: Dec. 29, 2009

(54) COOLANT FLUID CLEANING METHOD, SYSTEM, AND APPARATUS

(75) Inventor: Robin C. Moore, Roscoe, IL (US)

(73) Assignee: Hennig Incorporated, Machesney Park, IL (US)

( * ) Notice: Subject to any disclaimer, the term of this patent is extended or adjusted under 35 U.S.C. 154(b) by 807 days.

(21) Appl. No.: 11/220,188

(22) Filed: Sep. 6, 2005

(65) Prior Publication Data

US 2006/0049112 A1 Mar. 9, 2006

Related U.S. Application Data

(60) Provisional application No. 60/607,158, filed on Sep. 3, 2004.

(51) Int. Cl.
*C02F 1/48* (2006.01)
*B01D 35/06* (2006.01)

(52) U.S. Cl. .................. 210/695; 210/794; 210/806; 210/167.03; 210/167.04; 210/222; 210/223; 210/259; 210/297; 210/298; 210/323.1; 210/394; 210/396; 210/400; 210/402

(58) Field of Classification Search ............ 210/695, 210/794, 806, 167.03, 167.04, 222, 223, 210/259, 297, 298, 323.1, 394, 396, 400, 210/402, 433.1, 526
See application file for complete search history.

(56) References Cited

U.S. PATENT DOCUMENTS

| | | | |
|---|---|---|---|
| 1,726,608 A | | 9/1929 | Brackett |
| 2,717,080 A | * | 9/1955 | Anderson .................. 210/222 |
| 2,876,904 A | | 3/1959 | Fowler |
| 4,261,826 A | | 4/1981 | Dorgathen |
| 4,440,642 A | | 4/1984 | Frese et al. |
| 4,774,010 A | | 9/1988 | Bratten |
| 4,858,769 A | | 8/1989 | DeVries |
| 4,895,647 A | | 1/1990 | Uchiyama |
| 4,992,167 A | | 2/1991 | Uchiyama |
| 5,087,358 A | | 2/1992 | Massignani |
| 5,116,490 A | | 5/1992 | Fontenot |
| 5,158,691 A | | 10/1992 | McEwen et al. |

(Continued)

FOREIGN PATENT DOCUMENTS

EP 0 388 709 6/1994

OTHER PUBLICATIONS

T&P Tooling & Roduction, 2004.

*Primary Examiner*—David A Reifsnyder
(74) *Attorney, Agent, or Firm*—Reinhart Boerner Van Deuren P.C.

(57) ABSTRACT

Coolant fluid cleaning method, system, and apparatus use a rotating magnet to remove particulate matter from a fluid used to cool or lubricate a machining or other operation. Such system includes a rotating magnet in fluid communication with apparatus circulating fluid past the rotating magnet. A scraper blade removes particulate matter which is picked up by the rotating magnet. The system or apparatus can include a dirty fluid reservoir, one or more conveyor which removes chips and particulate matter from the dirty fluid reservoir, and a clean fluid reservoir. The rotating magnet collects particulate matter in the dirty fluid reservoir and discharges the collected particulate matter to a discharge conveyance. When the rotating magnet is used in combination with a disc filter, the magnet relieves some cleaning load from the disc filter.

53 Claims, 8 Drawing Sheets

U.S. PATENT DOCUMENTS

| | | |
|---|---|---|
| 5,167,839 A | 12/1992 | Widmer, II et al. |
| 5,221,469 A | 6/1993 | Nehls |
| 5,256,290 A | 10/1993 | Becker et al. |
| 5,389,256 A | 2/1995 | McEwen et al. |
| 5,423,977 A | 6/1995 | Aoki et al. |
| 5,569,382 A | 10/1996 | Reynders |
| 5,603,846 A | 2/1997 | Uchiyama et al. |
| 5,637,213 A | 6/1997 | McEwen et al. |
| 5,738,782 A | 4/1998 | Schäfer et al. |
| 5,820,756 A | 10/1998 | McEwen et al. |
| 5,849,183 A | 12/1998 | Ota et al. |
| 5,858,218 A | 1/1999 | Setlock et al. |
| 5,992,642 A | 11/1999 | Ota |
| 6,571,959 B1 | 6/2003 | Moore et al. |
| 2003/0010705 A1 | 1/2003 | Lenhart |

\* cited by examiner

COOLANT FLUID CLEANING METHOD, SYSTEM, AND APPARATUS

CROSS-REFERENCE TO RELATED PATENT APPLICATIONS

This patent application claims the benefit of U.S. Provisional Patent Application No. 60/607,158, filed Sep. 3, 2004, the entire teachings and disclosure of which are incorporated herein by reference thereto.

BACKGROUND

This invention relates to systems for removing particulate matter suspended in a fluid, and more particularly to systems for removing fine particles from cooling fluid utilized in combination with the machining of metal or non-metals.

There are many applications in which it is necessary for environmental reasons, or for the reclamation and recycling of resources, to separate particulate matter which is suspended in a liquid, from the liquid itself. One example of such an application is the need to remove particulate matter from water used by an industrial floor cleaning machine, or a street sweeping machine, prior to disposing of the water in an environmentally safe manner. Another example of such an application is the removal of waste material from coolant used with cut-off saws or grinding machines. Yet another example of such an application is the necessity to separate chips and fine particles of waste material from coolants used with machine tools to facilitate the machining of metal or non-metallic materials.

The process of machining a workpiece into a finished part on a machine tool requires that a cutter be applied to the workpiece to remove certain material portions of the workpiece in order to achieve the desired shape or finish in the resultant part. The action of the cutter against the workpiece generates a quantity of removed material such as chips or fine particles. The action of the cutter also typically generates a substantial amount of heat in the cutter and in the workpiece. These chips or particles of waste material, and the heat generated, must be removed from the cutter and the workpiece, and must be transported away from the cutter and the workpiece during the machining process, in order to achieve dimensional accuracy of the finished part, and in order to allow the cutter to operate at the high speeds necessary to effectively and efficiently shape the finished part without overheating.

In order to remove the chips or particles, and the heat generated in the machining process, machine tools generally incorporate a cooling and flushing system for directing a flow of a coolant liquid or oil at the workpiece and cutter during the machining process. The coolant liquid or oil absorbs heat generated at the interface of the cutter and the workpiece, and transports heat, chips, and particles away from the cutter and the workpiece. After flowing over the cutter and the workpiece, the coolant fluid, with the chips and/or particles entrained, is collected and removed from the machine tool.

Modern machining processes are carried out at very high speeds, requiring a large flow of coolant fluid for effective removal of the chips and heat. Depending upon the machining process involved, a continuous flow of coolant is required during the machining process at flow rates in the range of 10 to 400 gallons per minute. This flow of coolant is typically supplied to the machine tool by a coolant fluid circulating and cleaning system which includes mechanisms for separating the chips and particles from the flow of coolant so that the coolant can be continuously re-circulated. This invention is directed at novel apparatus and methods for effecting such separation of particulate material from the cooling/flushing fluid.

In conventional cleaning systems, larger sized chips or particles of waste material are separated, from the cooling fluid primarily by the force of gravity. In some coolant cleaning systems which utilize scraper type conveyors, the coolant fluid drained from the machine tool is directed into a dirty fluid reservoir of the coolant cleaning system where the chips and particles are allowed to settle in the bottom of the reservoir. A conveyor mechanism then scrapes across the bottom of the reservoir to pick up the settled chips and particles and transports them to a chip collection bin or container. The coolant which is above the bottom of the tank is then drawn off by a pump and re-circulated to the machine tool. In other coolant cleaning systems, the coolant with entrained chips and particles is directed onto a screen, or a hinge belt conveyor system, as the fluid enters the dirty fluid reservoir, so that the fluid can run through the screen or hinge belt into the bottom of the reservoir, with the larger sized chips and particles being screened out and separated from the coolant fluid by the screen or hinge belt. The liquid and the relatively smaller particles pass through the screen or belt and into the underlying pool of coolant. The particles tend to settle to the bottom of the pool, and are removed by a scraper. The supernatant liquid is collected, and re-circulated to the machine tool. A permanent magnet may be disposed on the bottom wall of the reservoir to supplement the force of gravity with magnetic attraction of ferrous chips and particles in a downward direction toward the bottom wall of the reservoir.

Although known coolant cleaning systems which utilize the force of gravity work reasonably well for larger sized chips and particles, there are several inherent problems involved in the practical application of such systems which have led the designers of such systems to also include additional filtration devices in their systems.

For coolant systems which rely on the force of gravity to cause the chips and particles of waste material to settle out on the bottom of the fluid reservoir, one inherent problem is that the flow rates of coolant demanded by modern machining processes do not allow the fluid to remain stagnant in the fluid reservoir long enough for smaller chips and fine particles of waste material to settle out in the bottom of the tank. While, in theory, and given enough time, all particles of waste material would eventually settle to the bottom of the tank, practical considerations, such as limitations on floor space, prevent system designers from providing fluid reservoirs large enough to enable all particles to settle to the bottom. For example, a coolant system which is required to provide 400 gallons per minute of coolant to a machine tool would need to have a fluid reservoir capable of holding 2000 gallons of incoming dirty coolant in order to allow the coolant to remain in the reservoir for a period of five minutes before being re-circulated to the machine tool. In practice, a reservoir this large simply takes up too much floor space for most applications. As a compromise, the fluid reservoir capacity of many coolant cleaning systems is designed to hold enough coolant for the coolant, on average, to remain in the reservoir for 1 to 1.5 minutes before leaving the reservoir for recirculation. This means that the coolant in the reservoir is never really stagnant, but is actually flowing through the reservoir at a rate high enough to keep some of the finer particles suspended in the fluid. Swirling and churning of the fluid in the tank, caused by draw down of the circulation pump and the actions of conveyors, hinge belts, and the like moving through the reservoir, increase the quantity of relatively finer particles which remain suspended in the coolant.

Even if the coolant in the fluid reservoir could remain relatively stagnant, other factors such as viscosity and surface tension of the coolant tend to cause the relatively finer particles to remain suspended in the fluid rather than to settle out. Given the tight tolerances required in some machining operations, even a small percentage of suspended fine particles is of enough concern to motivate the user to employ additional efforts to remove additional material beyond that which can be removed by the force of gravity.

Coolant cleaning systems which utilize a hinge belt or inlet screen to catch and convey away the chips and particles of waste material as the fluid enters the reservoir, rather than allowing them to settle to the bottom for removal by a conveyor, also must deal with the problem of removing the finer particles which remain suspended in the fluid. All of the factors described above in relation to coolant cleaning systems which rely on settlement of waste material to the bottom of the fluid reservoir, which enable relatively finer particles to remain suspended in the fluid, such as swirling or churning of the fluid, surface tension effects, etc., are also present in cleaning systems which utilize inlet screens or hinge belts to capture the larger chips and particles as the dirty fluid enters the reservoir. For these systems, as a practical matter, the mesh size of the inlet screen or the spaces that allow passage of the fluid through the belt must be large enough to allow the majority of the waste material to be removed at very high rates, given the large volume of waste material which must be dealt with as a result of the high speeds of modern machining operations. Stated another way, floor space considerations place practical limitations on the size and operating capacities of particulate matter removal and conveying devices, resulting in such devices being designed to tolerate the passage of finer suspended particles in order to handle the volume of larger chips and particles in the space available for the inlet screen or conveyor at the prescribed rate.

In the most commonly utilized approach to providing additional filtration of the coolant fluid, a drum filter rotatable about an axis of rotation of the drum is provided. The drum includes a generally cylindrically-shaped screen on the outer periphery of the drum. The drum filter is positioned within the dirty fluid reservoir in such a manner that fluid containing entrained or suspended particles flows into the drum through the cylindrical screen in a direction of flow oriented generally perpendicular to the axis of rotation of the drum. An opening is provided in an end wall of the drum, and a corresponding opening is provided in a wall of the fluid reservoir, so that once the fluid has flowed into the drum through the cylindrical filter in a direction perpendicular the axis of rotation, the cleaned fluid inside the drum can change direction inside the drum and exit through the opening in the end wall of the drum and the corresponding opening in the wall of the fluid reservoir in a direction generally parallel to the axis of rotation of the drum.

A dynamic seal is generally provided in the fluid reservoir between the end wall of the drum and the wall of the fluid reservoir to prevent the dirty fluid from bypassing the drum filter, and to prevent the cleaned fluid, which is exiting the end wall of the drum from re-entering the fluid reservoir. Backwash nozzles for directing a spray of fluid or air either at or outward through the cylindrical screen are also generally provided to remove particulate matter adhering to the outside of the cylindrical screen. Typically the backwash nozzles are located inside the drum. The drum is generally rotated either by a drum sprocket attached to the outer periphery of the drum in such a manner that a portion of a chip conveyor chain or belt moving under or over the outer periphery of the drum engages the sprocket and turns the drum, or the drum is rotated by a separate drive apparatus which separately drives the drum.

It is also known to use multiple drum filters in parallel in a single filtration apparatus, thereby to provide fractional filtration of the dirty coolant so that filtered coolant with varying degrees of cleanliness can be supplied to match the cleanliness requirements of various machining operations.

However, there remains a need for systems, apparatus, and methods of removing the relatively finer particles more efficiently and more effectively.

There remains a need to remove even smaller size particles than are removed according to known art.

There is a need to remove a higher fraction of especially the smaller size particles then are removed according to the known art.

SUMMARY

This invention provides methods, systems, and apparatus adapted to clean coolant cleaning fluids as well as other liquid systems which contained entrained detritus and/or other debris or particles. The invention contemplates use of a magnetic drum which rotates partially in the dirty fluid, partly out of the dirty fluid. As the magnetic drum rotates through the dirty fluid, ferritic particles in the fluid are attracted to, and become deposited on, the outer cylindrical surface of the drum. A scraper blade scrapes the particles from the drum surface. The particles agglomerate with each other as they are forced toward the back edge of the blade. The agglomerated particles are ultimately forced off the back of the edge of the blade by additional particles which are being picked up by the leading edge of the blade which is disposed against the magnetic drum. In some embodiments, the drum is so positioned, and the blade is so configured, that the agglomerated particles drop from the blade onto an inclined portion of a housing in which the dirty fluid is received, beyond the edge of the fluid. The agglomerated particles are picked up by a scraper conveyor and conveyed upwardly to a particle/chip discharge.

The magnetic drum can be used in combination with one or more disc screen filters, generally positioned adjacent the magnetic drum. Spray-back nozzles can be used to spray clean fluid through the filter back toward the drum in that portion of the filter which is out of the liquid. The drum is so positioned relative to the disc filter and the nozzles, that the nozzles generally direct the material, which is dislodged from the filter, back onto the magnetically charged cylindrical outer surface of the magnetic drum.

Figure 1:
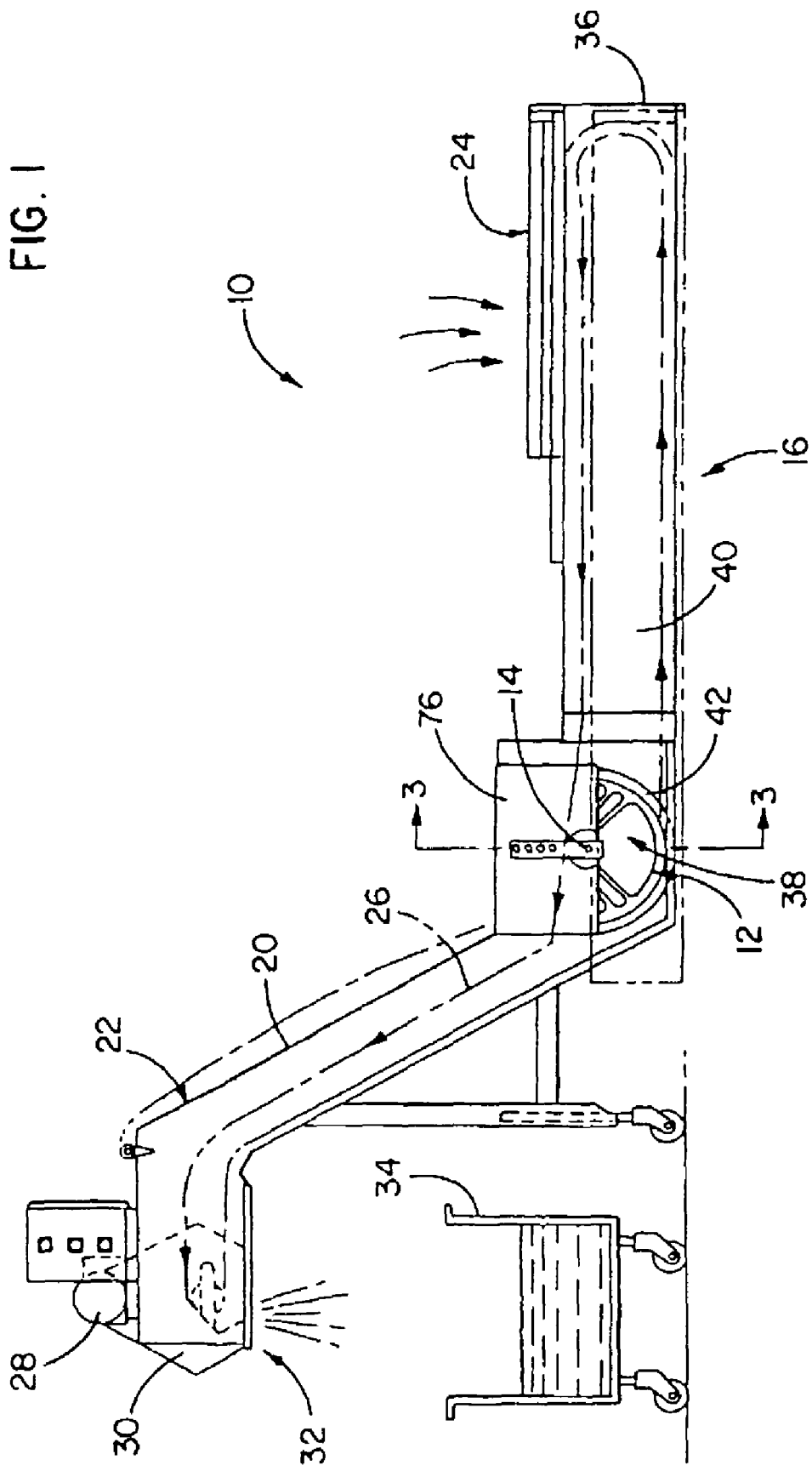
FIG. 1 shows a side elevation view of a first embodiment of coolant fluid cleaning apparatus of the invention, for use in a machine tool environment.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
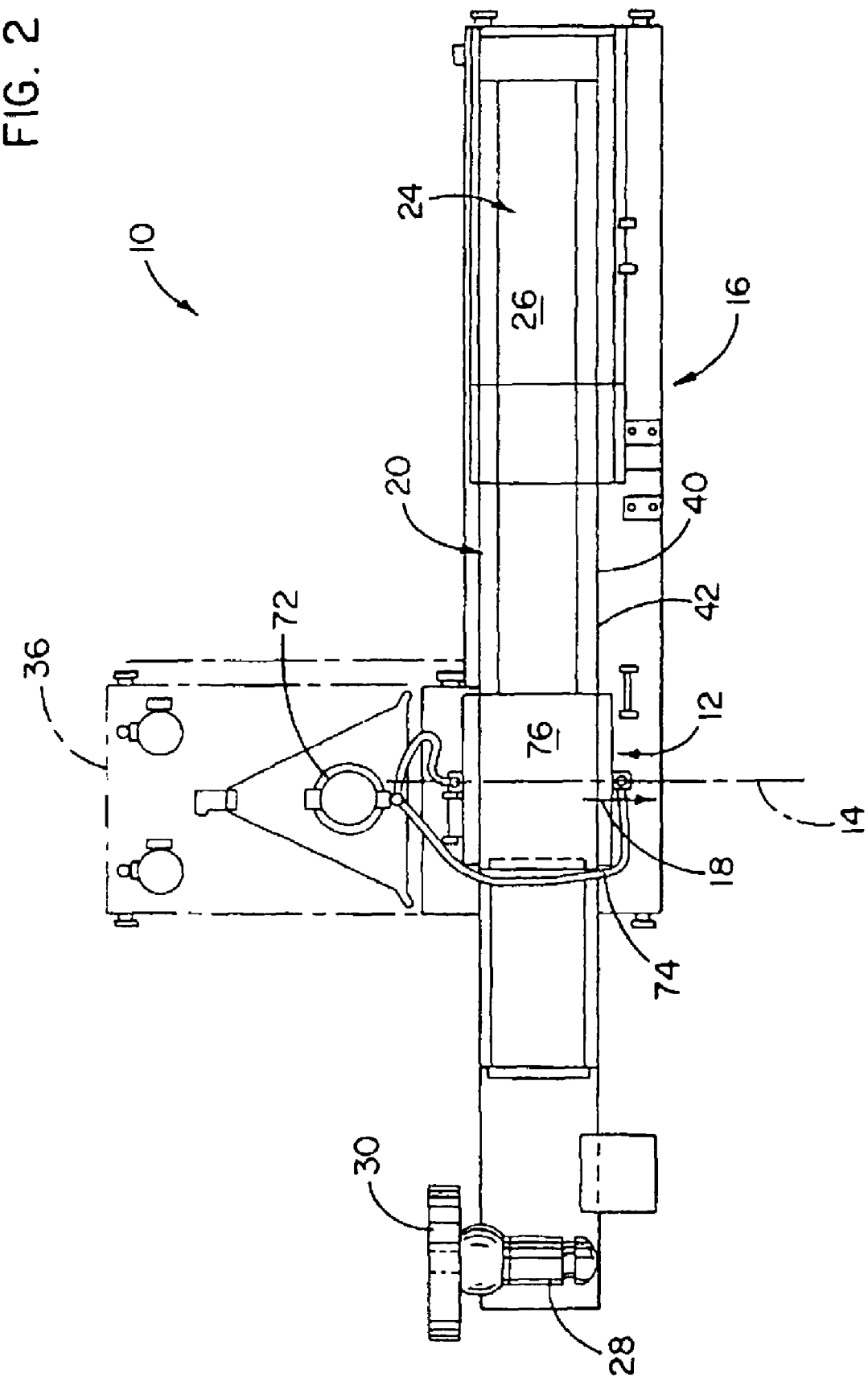
FIG. 2 shows a top view of the coolant fluid cleaning apparatus of FIG. 1.

FIGS. 1 and 2 illustrate a coolant fluid cleaning system 10 for use in combination with a machine tool, which is not shown. Coolant fluid cleaning system 10 includes a filter disk assembly 12 journalled for rotation about an axis of rotation 14 of filter disk assembly 12. Coolant cleaning system 10 further includes fluid circulating apparatus 16, operably connected in fluid communication with filter disk assembly 12, for circulating a flow of coolant fluid through filter disk assembly 12 in a direction 18 (FIG. 2) which is substantially parallel to axis of rotation 14 of filter disk 12.

Figure 3:
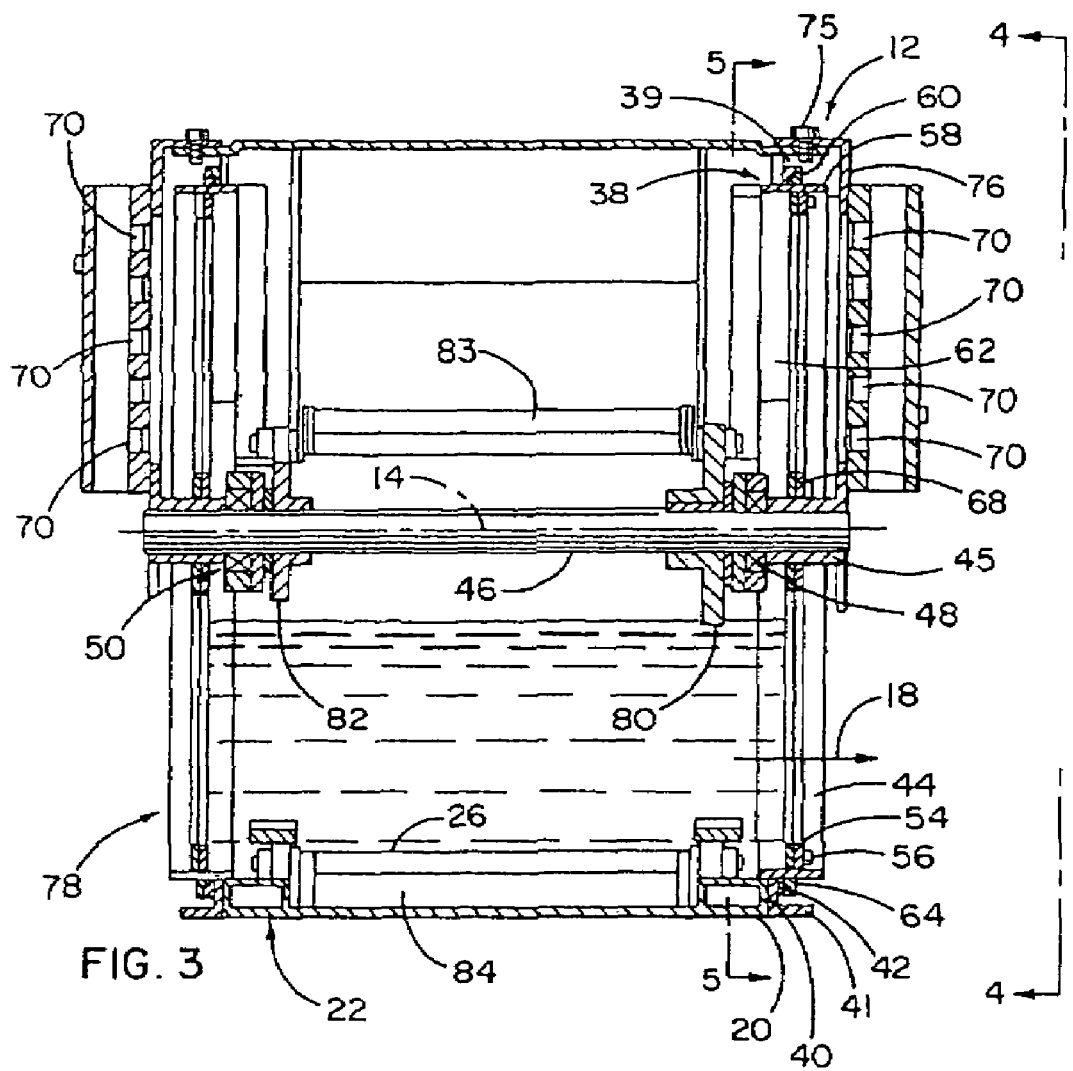
FIG. 3 shows a cross-section view of the coolant fluid cleaning apparatus of FIG. 1, taken along line 3-3, of FIG. 1.

As illustrated in FIGS. 1-3, fluid circulating apparatus 16 includes a first fluid reservoir, in the form of a conveyor housing 20 of a conveyor system 22. Housing 20 has an inlet hopper or other opening 24 which is adapted and configured to receive and retain a flow of coolant fluid which contains entrained chips and other particles of waste material, hereinafter referred to as "dirty fluid," from the machine tool. In the embodiments illustrated in FIGS. 5-8, the dirty fluid entering hopper 24 fails onto a particulate matter conveyor, namely a hinge belt conveyor 26. The larger chips and particulate matter in the dirty fluid are caught by conveyor 26, and the fluid, bearing the entrained relatively finer particles, passes through openings in conveyor 26 and downwardly into an underlying pool of the coolant liquid contained in conveyor housing 20. The upper run of conveyor 26 remains generally above the pool of coolant liquid. The larger chips and particles which are retained on conveyor 26 are then conveyed by the hinge belt conveyor and an appropriate drive, in the form of a motor 28 and drive train 30, to a discharge locus 32, where the chips and other particulate matter carried on hinge belt conveyor 26 are discharged from conveyor 22 into a chip collection bin 34.

Fluid circulating apparatus 16 further includes an "L-shaped" second clean fluid reservoir 36 which receives and retains coolant fluid, hereinafter referred to as the clean fluid, after the fluid has passed through disk filter assembly 12. As best seen in FIGS. 1 and 2, conveyor housing 20 rests partially within L-shaped clean fluid reservoir 36. Conveyor housing 20 is a welded, fluid-tight, assembly. A seal plate 40 attached to a sidewall of conveyor housing 20 defines an outlet opening 38 from the conveyor housing 20 and a sealing surface 42, which mates with filter disk assembly 12 such that the only avenue for passage of fluid from conveyor housing 20 into clean fluid reservoir 36 is through filter disk assembly 12.

Figure 4:
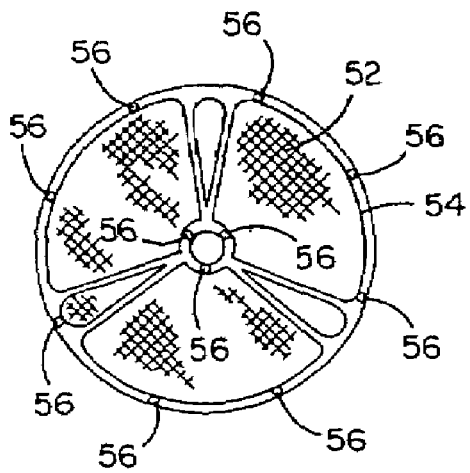
FIGS. 4 and 5 are partial sectional views of the coolant fluid cleaning apparatus of FIG. 1, taken respectively along lines 4-4 and 5-5 of FIG. 3.

As shown in FIG. 3, filter disk assembly 12 includes a frame 44, fixedly attached by a set screw, not shown, and a locking collar 45 to a shaft 46 journalled in bearings 48, 50 attached to conveyor housing 20 for rotation about axis of rotation 14 of filter disk assembly 12. A filter element in the form of a screen 52 is mounted to frame 44 of filter disk assembly 12 using a clamping plate 54 and screws 56, as shown in FIGS. 3 and 4. In exemplary embodiments, screen 52 is generally flat, and is fabricated from a stainless steel material having a standard mesh size of about 20 to about 400, or equivalent, with a mesh of 50 to 80 being preferred for most machine tool applications. While a variety of screen weaves are operable, a weave wherein the warp wire is of larger diameter than the shute wire, and wherein the weave is made up of a limited number of warp wires interwoven with the maximum number of shute wires which can be positioned, has been found to be satisfactory.

Use of a generally flat screen in the invention provides several advantages in comparison to the cylindrical shaped filters of prior fluid cleaning systems. A flat filter is easier to fabricate than a cylindrical filter. It is also possible to fabricate a flat filter from materials, such as brittle ceramics, which cannot be formed into a cylinder. Those having skill in the art will recognize, however, that filter elements made from materials, or filter elements, having structural configurations other than absolutely flat configurations, such as convoluted configurations, or crowned configurations, for example, can also be utilized with efficacy in practicing the invention, and are considered by the inventor to be within the scope of the claims of this invention. Those having skill in the art will also recognize that the mesh size selected for screen 52, relative to a particular implementation of the invention, is dependent upon the sizes of the particles which are suspended in the dirty coolant fluid, and upon the flow rate and degree of removal of fine particles which are required for the contemplated implementation. The term "screen" as used herein is intended to also encompass non-woven filter elements or other types of materials which are barriers to solids, but which pass liquids. Such materials can be formed by e.g. drilling or other known processes.

Figure 5:
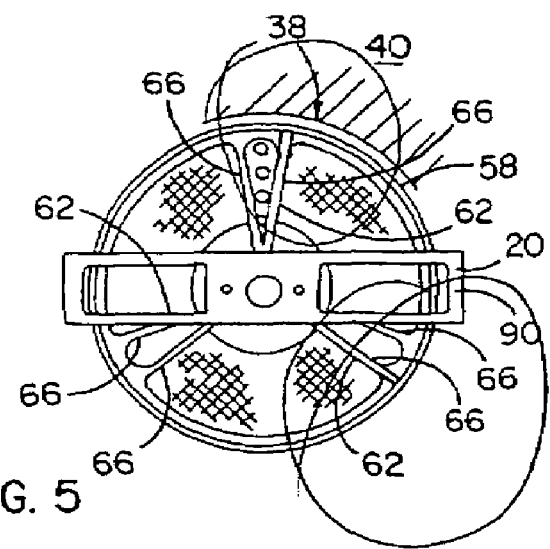

Frame 44 includes an outer axially extending flange 58 which is configured to extend through, and to fit with, only a small running clearance in outlet opening 38 in seal plate 40, as shown in FIGS. 3 and 5. The close fit between flange 58 and opening 38 provides the first stage of sealing the interface between outlet opening 38 and filter disk 12. Filter disk frame 44 also includes a radially extending annular sealing flange 60 attached to the outer periphery of axially extending flange 58 for attachment of a compliant V-shaped dynamic seal 64 fabricated from elastomeric material. When the filter disk assembly is clamped in place on shaft 46, V-shaped seal 64 is clamped between sealing flange 60 and sealing surface 42 of conveyor housing 20, to thereby provide a second stage of a dynamic seal which prevents dirty fluid from flowing past filter disk assembly 12 into clean fluid reservoir 36.

Seal 64 is located in the clean fluid reservoir and is thus inherently protected against abrasion and damage from chips and particles which are entrained in the dirty fluid. Furthermore, the tight fit between annular flange 58 of filter disk assembly 12 and outlet opening 38 provides a first stage of sealing against chips and particles. Those having skill in the art will also understand the advantages in manufacturability and maintainability provided by having filter disk assembly 12 which is located in clean fluid reservoir 36, and which is attached to shaft 46 in a manner which enables filter disk 12 to be easily and quickly e.g. removed for replacement of V-shaped seal 64.

As shown in FIG. 3, seal plate 42 includes an upper flange 39 and a lower flange 41 extending outwardly therefrom in a direction away from conveyor 22. Flanges 39, 41 serve to protect V-shaped seal 64 and filter disk 12 from being bumped or damaged when conveyor 22 is being moved inside or outside of clean fluid reservoir 36.

As shown in FIG. 5, frame 44 of filter disk 12 is configured to provide large openings for flow of fluid in a substantially axial direction between spoke-like legs 66 which join axially extending flange 58 to a central hub portion 68 of frame 44. Particle lifting fins 62 are optionally attached to some or all of legs 66 in such a manner that when filter disk assembly 12 is attached to shaft 46 44, lifting fins 62 extend into the dirty fluid reservoir to scoop up particulate matter which may have collected adjacent screen 52 in the dirty fluid reservoir, and to carry the scooped up particulate matter to the top of outlet opening 38.

As shown in FIGS. 2 and 3, fluid cleaning system 10 further includes an array of back wash nozzles 70, a backwash supply pump 72, and a backwash fluid supply circuit 74 which draws clean fluid from the clean fluid tank. Nozzles 70 are mounted outboard of filter disk assembly 12 and oriented to direct a spray of clean fluid back through screen 52, thereby to remove, dislodge particulate matter adhering to the dirty fluid reservoir side of screen 52, and any particulate matter scooped up by lifting fins 62. The removed particulate matter is carried, by the spray stream, away from the screen. The particulate matter, now in a relatively agglomerated or concentrated form, is forcefully carried away from screen 52, by back wash nozzles 70, generally back onto conveyor 26, whereupon the agglomerate material is conveyed out of dirty fluid reservoir housing 20 by conveyor 26, and deposited in chip collection bin 34. Any overflow of the sprayed-off particulate material, or particles which become entrained in the spray liquid, drain back into the dirty fluid reservoir, and are further processed such as by disc assembly 12.

As shown in FIGS. 1-3, a cover 76 is provided over that portion of conveyor housing 20 which is adjacent screen 52 to help direct and contain the fluid spray from backwash nozzles 70. Cover 76 is attached to upper flanges of housing 20 by screws 75. Cover 76 also functions as the mounting bracket for back wash nozzles 70. A portion of backwash fluid supply circuit 74 adjacent the nozzles is preferably fabricated of a flexible hose so that cover 76, with the nozzles 70 connected, can be readily lifted off housing 20 once screws 75 are removed.

As shown in FIGS. 2 and 3, the exemplary embodiments depicted in FIGS. 1-5 include a second filter disk assembly 78, and a second array of backwash nozzles 70, mounted on the left side of conveyor housing 20, to accommodate a correspondingly higher rate of flow of clean fluid through filter disk assemblies 12, 78 from the single dirty fluid reservoir 20. The construction details of second filter disk assembly 78 and second array of nozzles 70 are the same as the corresponding parts of first filter disk assembly 12 and first array of nozzles 70 except that, in appropriate instances, the parts and orientations are mirror images of the corresponding parts and orientations described above for the first filter disk assembly and the first array of nozzles.

As shown in FIG. 3, coolant fluid cleaning system 10 includes drive apparatus in the form of a drive sprocket 80, and a guide roller 82 operably connecting first and second filter disk assemblies 12, 78 to hinge belt conveyor 26 in such a manner that the conveyor drive train 30 and motor 28 rotatably drive the filter disk assemblies 12, 78. Drive sprocket 80 is fixedly attached by a set screw bearing on a key in shaft 46 44 in such a manner that, as hinge belt 26 is pulled through conveyor 22 by drive motor 28 shaft 46 44 and both filter disk assemblies 12, 78 are rotated about their common axis of rotation 14.

In one set of embodiments, stiff cleats 83 are attached to and extend outward from approximately every eighth hinge flap of hinge belt conveyor 26, to facilitate conveying the chips and particulate material to chip bin 34. In addition, one or more of cleats 83 is omitted and replaced with a thin flexible scraper blade 84, attached to the hinge belt conveyor and configured to sweep along the bottom surface of conveyor housing 20. The lower end of housing 20 is configured to be contacted and scraped by scraper blades 84, along the entirety of the length of that portion of the housing surface which so faces the scraper blades. As hinge belt conveyor 26 traverses the bottom of conveyor housing 20, cleats 83 and scraper blades 84 sweep particulate matter which has settled onto the bottom of the dirty fluid reservoir defined by housing 20, along the bottom, upwardly about the lower end of conveyor housing 20 and drop the sweepings onto the top surface of hinge belt conveyor 26 as the belt emerges onto its top run along the housing, whereby such particulate matter can be gathered from the bottom of housing 20, dropped onto the top of the upper run portion of conveyor 26, and conveyed on conveyor 26 to chip bin 34.

Cleats 83 and scrapers 84 on hinge belt conveyor 26, in combination with the other aspects and features of the invention, provide a coolant fluid cleaning system 10 having the capability of simultaneously removing particulate matter located above, below, and between the upper and lower run portions of hinge belt conveyor 26. Chips and particles of waste material entering hopper 24, entrained in dirty coolant fluid drained from the machine tool, initially encounter the upper surface of the upper run portion of hinge belt conveyor 26. All material which is too large to pass through the gaps between the hinge flaps of hinge belt conveyor 26 is collected on the upper run of the conveyor and is conveyed to chip bin 34. Finer particulate matter which passes through hinge belt conveyor 26 can ultimately be picked up on filter disk assemblies 12, 78 and lifted back above the belt by lifting fins 62, or by adhering to the dirty side of the screen 52, and then being blown off of screen 52 and/or lifting fins 62, and back onto the upper surface of the upper run portion of hinge belt conveyor 26, by back wash nozzles 70, to be conveyed to chip bin 34 by hinge belt conveyor 26. Any particulate matter which makes it all the way to the bottom of housing 20, which defines the dirty fluid reservoir, by settling, or which somehow bypasses or is carried around on the hinge belt conveyor 26, is swept back up to the top side of hinge belt conveyor 26 by cleats 83 and/or scrapers 84, and conveyed to chip bin 34.

Although the invention is described herein with respect to certain specific embodiments and applications, many other embodiments and applications are possible within the scope of the invention as described in the appended claims.

Figure 6A:
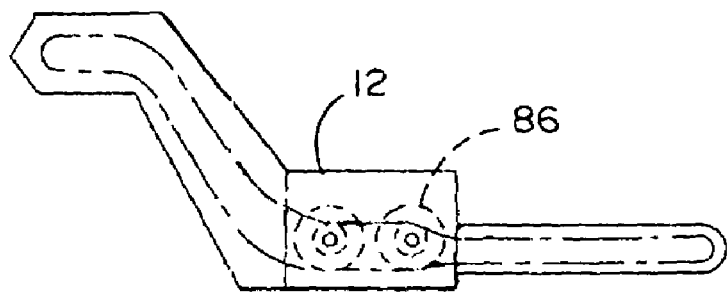
FIGS. 6A, 6B, and 6C, show alternate embodiments of coolant fluid cleaning systems according to the invention.

For example, although the exemplary embodiment illustrated in FIGS. 1 and 2 utilize two filter disk assemblies 12, 78 having identical configurations arranged to provide parallel flow paths between a single dirty fluid reservoir and a single clean fluid reservoir, other combinations are possible and are contemplated to be within the scope of the foregoing description and the appended claims. For example, as shown in FIG. 6A, additional filter disk assemblies 86 can be utilized to increase the number of parallel flow paths available, and in combination with variations in the screen mesh, screen-to-screen enable the rate of flow of clean coolant and the degree of cleanliness to be adjusted to suit a particular application of the invention. Alternatively, by utilizing screens 52 of different mesh in multiple filter disk assemblies feeding separate clean fluid reservoirs, fractional filtration can be provided from a single dirty fluid reservoir. Or serial filtration can be employed with increasingly smaller mesh sizes along the direction of flow of the coolant fluid, in order to better control screen-cleaning requirements or maximum particle size in the resultant cleaned fluid.

Figure 6B:
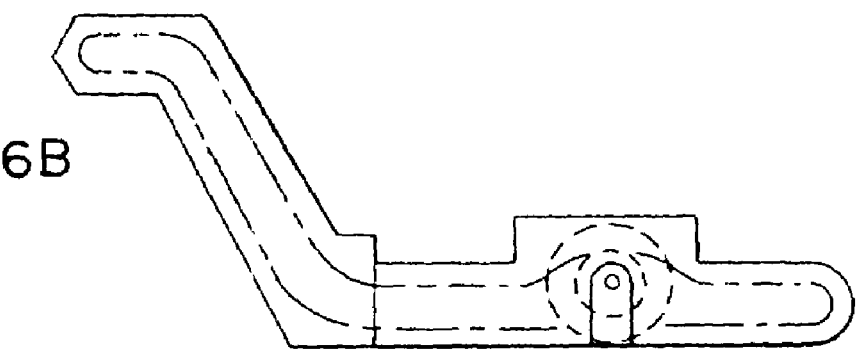

As shown in FIG. 6B, filter disk assemblies of the invention can be located at positions along the side walls of the conveyor housing other than the position illustrated in FIGS. 1 through 5. For example, a filter disk assembly 12 according to the invention can also be located in e.g. a lower end wall of the conveyor housing, and other types of conveying devices, such as an auger, a scraper chain, or a continuous belt, can be used in place of the hinge belt conveyor.

Figure 6C:
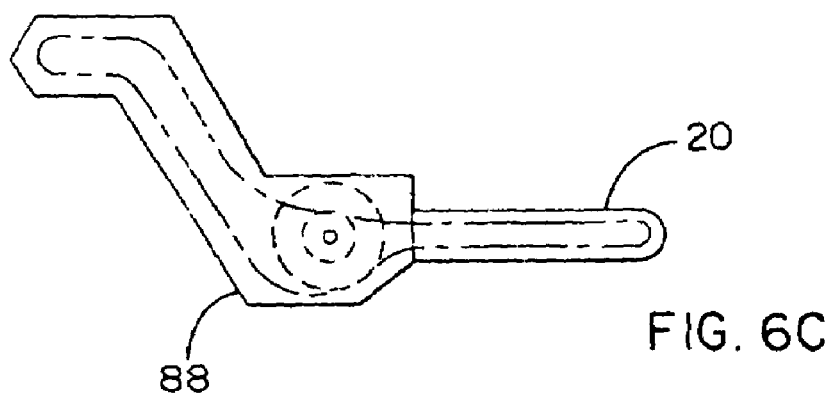

As shown in FIG. 6C, filter disk assemblies of the invention can be utilized in combination with a low profile conveyor, by locating the filter disk assemblies in a sump 88 in the bottom wall of conveyor housing 20, to provide a coolant fluid cleaning device having both chip conveying and fluid filtering capability in a system suitable for use on machine tools, such as lathes, which have not previously been able to utilize a fluid filter because there was simply not enough space available to accommodate the larger conveyor and filter apparatus of prior systems utilizing drum filters.

The inventor also contemplates embodiments of the invention in the form of a kit for retrofitting filter disk assemblies and/or the improved dynamic seals of the invention into existing fluid cleaning devices which were originally designed without a fine filter, or which include a drum type filter.

For example, as shown in FIG. 3, where conveyor 22 is originally built without a fine filter, such a kit for retrofitting filter disk assemblies 12, 78 according to the invention, into conveyor 22, includes (i) a pair of seal plates 42; (ii) filter disk assemblies 12, 78; (iii) back wash nozzles and pumping apparatus; and (iv) an adapter drive which operatively connects filter disks 12, 78 to conveyor housing 20 and the existing hinge belt conveyor 26. The adaptor drive includes a shaft 46, a drive sprocket 80, guide roller 82, a pair of bearing support brackets 90 such as those shown in FIG. 5, bearings 48, 50, and the various locking collars, set screws, spacers, and the like used to secure and operatively connect the various elements of the adaptor drive to filter disk assemblies 12, 78. To retrofit filter disk assemblies 12, 78 into conveyor 22, bearing plates 42 and bearing support brackets 90 are attached to conveyor housing 20, by welding for example, and holes are cut in conveyor housing 20 corresponding to outlet openings 38 in seal plates 42. The remainder of the parts in the retrofit kit as defined above are installed as shown in FIG. 3 to complete the retrofit. If conveyor 22 has originally been built with a drum filter, the retrofit process is essentially the same, but the drum can be removed in the retrofit process.

Figure 7:
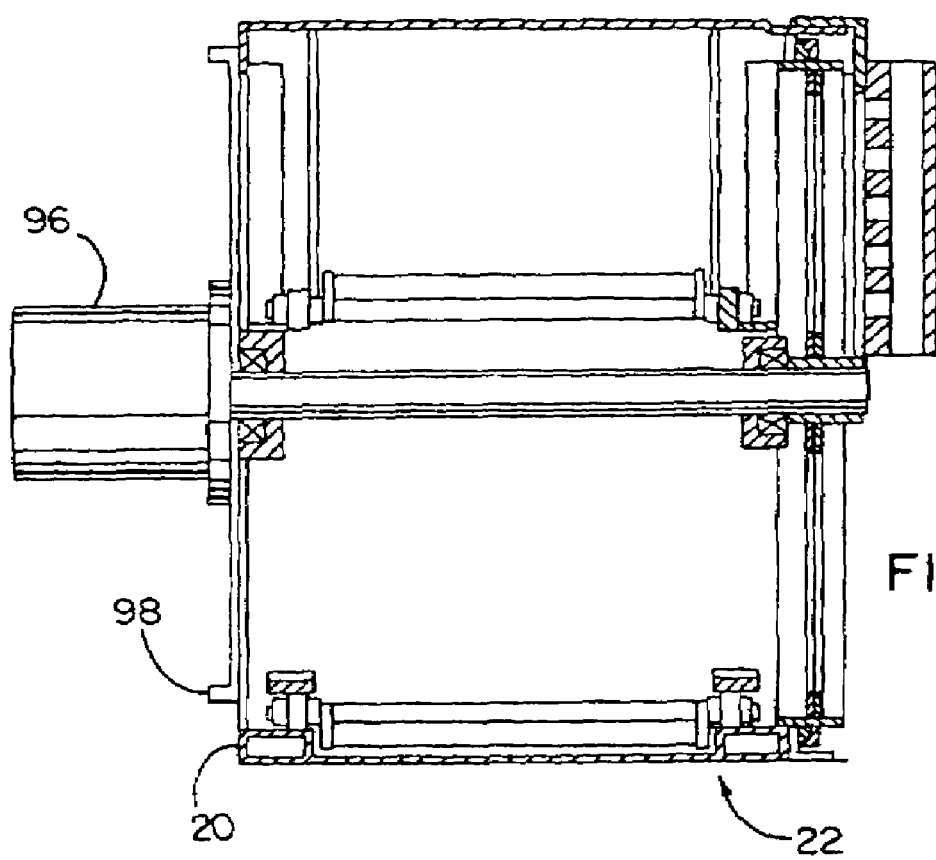
FIG. 7 shows a sectional view of an alternate embodiment of coolant fluid cleaning apparatus of the invention, having a dedicated drive system for a filter disk assembly.

As shown in FIG. 7, the retrofit process can be simplified by providing, in the retrofit kit, a separate drive motor 96 for filter disk assembly 12 mounted on a motor mount plate 98 attached to conveyor housing 20, so that the need to operatively connect filter disk assembly 12 to the existing drive in the conveyor is eliminated.

Figure 8:
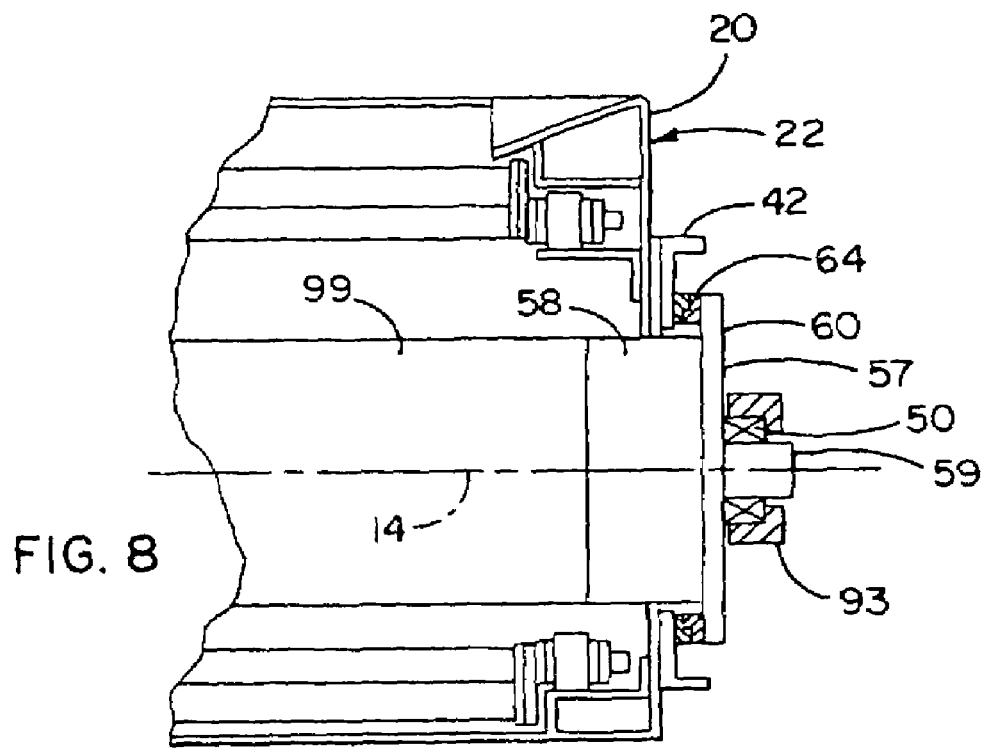
FIG. 8 shows a partial sectional view of an embodiment of the invention wherein an improved dynamic seal, according to the invention, is utilized with a drum type filter.

As shown in FIG. 8, the invention also contemplates that the improved dynamic seal of the invention can be adapted for use with a drum type filter 99. A seal plate 42 having an outlet opening 38 is attached to conveyor housing 20 in the same manner as described herein with regard to mounting a filter disk assembly according to the invention. A seal adapter housing 57 having an axially extending annular portion 58 closely matching the diameter of outlet opening 38 is attached to filter drum 99. Seal adapter housing 57 further includes a radially extending annular sealing flange 60, and a stub shaft 59 for mounting drum 99 in bearing 50, which is in turn mounted in a bearing support bracket 93 attached to conveyor housing 20. A seal 64 is attached to radially extending flange 60 and in such a manner that when drum 99 with seal adapter housing 57 attached is mounted for rotation about axis 14, the seal is compressed to provide a fluid seal between seal plate 42 and radially extending annular flange 60 of seal adapter housing 57. This arrangement provides the same advantages in a drum filter of two stage sealing and locating the seal in the clean fluid reservoir that are provided by the practice of the improved seal of the invention with filter disk assemblies.

Figure 10:
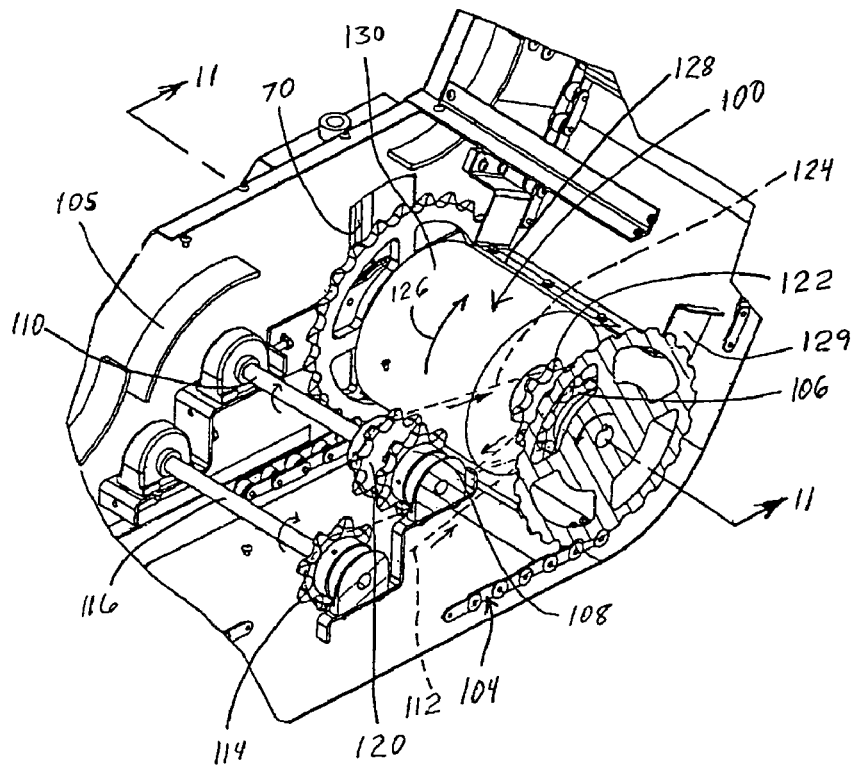
FIG. 10 shows a pictorial view of a portion of the conveyor system of FIG. 9 at the filter disk assembly area, more fully illustrating the rotating magnetic drum, and taken at the circle 10 in FIG. 9.
Figure 9:
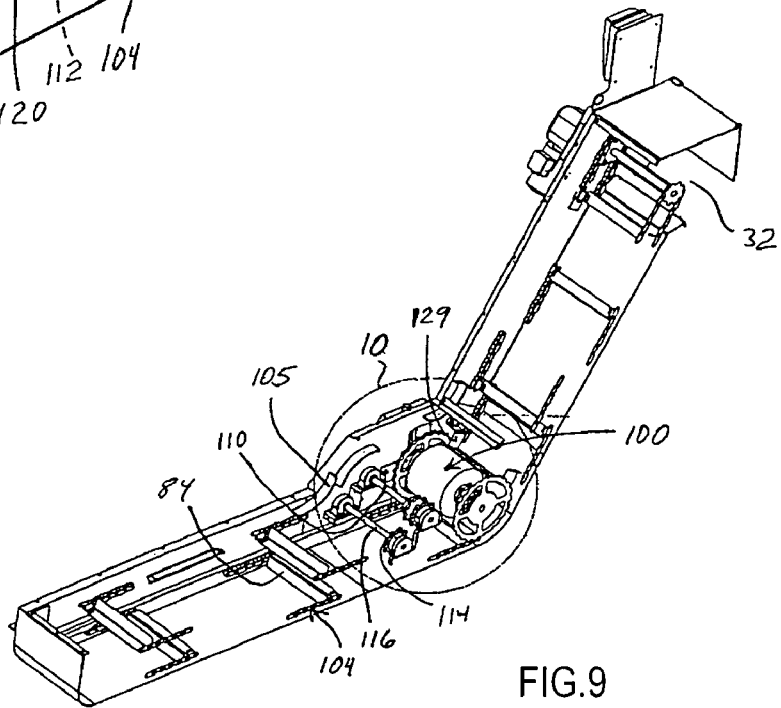
FIG. 9 shows a pictorial view of another embodiment of cleaning systems of the invention, which further includes a rotating magnetic drum in the conveyor housing, in addition to the rotating disc filter.
Figure 11:
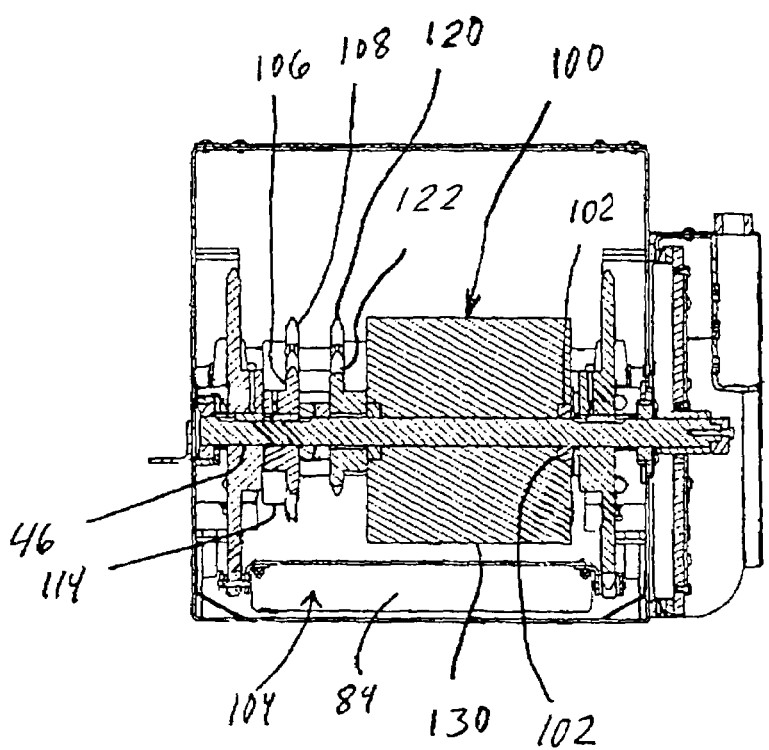
FIG. 11 shows a cross-section of the cleaning system of FIGS. 9 and 10, through the magnetic drum, and is taken at 11-11 of FIG. 10.

FIGS. 9-11 illustrate yet another set of embodiments of the invention, wherein a rotating magnetic drum 100 is mounted on shaft 46, and is journalled on bearings 102 for rotation about shaft 46 independent of the rotation of shaft 46. Hinge belt conveyor 26 is replaced with a scraper chain conveyor 104, and is routed about magnetic drum 100 by flights 105.

Drive sprocket 106 is mounted on shaft 46 and is keyed to shaft 46 for rotation in combination with the rotation of shaft 46. Drive sprocket 108 is mounted on a second shaft 110 which is aligned with, and offset from, shaft 46 Sprocket 108 is aligned with sprocket 106, such that a first drive chain 112, illustrated in dashed outline, can extend between sprockets 106 and 108 in a common plane. An idler sprocket 114 is mounted on a third shaft 116 which is aligned with, and offset from both of shafts 46 and 110, with shaft 110 between shaft 46 and shaft 116. Sprocket 114 is keyed to shaft 116 so as to rotate in common with rotation of the shaft. Shafts 110 and 116 are journalled from the conveyor housing by suitable bearings.

As suggested in FIGS. 9 and 10, the first drive chain 112 extends about drive sprocket 106 and moves away from the top of drive sprocket 106 and into driving engagement with the lower portion of sprocket 108, causing sprocket 108 to rotate in a direction opposite to the direction of rotation of drive sprocket 106. The drive chain then progresses from the lower portion of sprocket 108 to the upper portion of idler sprocket 114, about sprocket 114, and passes from the lower portion of sprocket 114 to the lower portion of drive sprocket 106, thus completing the driving loop which drives sprocket 108.

A drum drive sprocket 120 is mounted to shaft 110 offset along the length of the shaft from sprocket 108. Both sprocket 108 and drum drive sprocket 120 are keyed to shaft 110 so as to rotate in common with shaft 110. A driven drum sprocket 122 is mounted e.g. either to drum 100 or to a stub shaft which extends from drum 100, so as to rotate in common with drum 100. A second drive chain 124 extends in a simple loop about sprockets 120 and 122, whereby rotation of sprocket 120 is effective to drive sprocket 122, which drives rotation of drum 100. Given the configuration of the path of the drive chain which conveys driving force from sprocket 106 to sprocket 108, and wherein the chain then passes back to sprocket 106 from the lower portion of sprocket 114, shaft 110 turns in the opposite direction from shaft 46, whereby sprockets 120 and 122, and thus drum 100, turn in the opposite direction from shaft 46 and screens 52, namely in the direction shown by the arrow 126 in FIG. 10.

Magnetic cleaning blade 128, made from for example magnetic stainless steel, is mounted by bracket 129 from conveyor housing 20, bears against the outer surface 130 of magnetic drum 100, and is drawn to drum 100 by the magnetic field of the drum. As mounted on shaft 46, the drum is generally positioned so that the upper portion of the drum, and cleaning blade 128, are out of the coolant fluid. Blade 128 scrapes clean the particulate material which is attracted to the outer surface of the magnetic drum.

Bracket 129 extends entirely across the width of housing 20 and supports blade 128 along the entirety of the length of the blade, across the width of the drum. The collected particles are cleaned, e.g. scraped,, from drum 100 by the blade. As particles are progressively collected on blade 128, the newly-arriving particles tend to push the particles already on the blade toward the rear edge of the blade and onto and across bracket 129, which is not magnetically attracted to drum 100. As the particles move across bracket 129, the particles lose the magnetic polarization of the drum, such that the particles are free to drop off the blade as they reach the back edge of the blade.

In this embodiment, a dirty coolant fluid enters the conveyor system 22 as before at inlet hopper 24. However, contrary to the embodiments which use the hinge belt conveyor, since a conventional scraper conveyor does not intercept the metal particles before they enter the pool of fluid in housing 20, the upper run portion of scraper conveyor 104 need not be carried above the pool of fluid, and can thus be immersed in the dirty coolant fluid as desired, which is the case with the illustrated embodiment. Accordingly, the heavier, and/or larger particles of metal in the dirty fluid fall to the bottom of conveyor housing 20 by gravity, where they are intercepted by scraper blades 84 and are pushed along the bottom of the housing as the bottom flight of the chain moves from the area adjacent inlet hopper 24 toward the drum, and thence up toward the discharge end of the conveyor system.

Meantime, drum 100 is driven by the drive train described in terms of sprockets 106, 108, 114, 120, and 122, and the respective drive chains. As drum 100 rotates in the dirty fluid, the ferrous metal particles in the dirty fluid are attracted by the magnetic field on the drum, and attach themselves to the drum in accord with the magnetic field. As the drum rotates, movement of the drum moves the attached particles progressively toward cleaning blade 128. As respective particles reach cleaning blade 128, the blade scrapes the particles off the surface of the drum and onto the blade. On blade 128, the scraped-off particles are generally, but not completely, drained of the coolant fluid, and form agglomerates of the particles, which generally hold together in particle masses. The scraped-off particles are progressively pushed off blade 128 by subsequently arriving scraped particles. Blade 128 is sufficiently wide, along the direction of rotation of drum 100 that, as the particles are pushed off blade 128, they fall as masses of agglomerated particles past drum 100 and onto the bottom of housing 20. In some embodiments, the masses of scraped-off particles drop directly onto the inclined portion of the bottom of the conveyor housing, past the edge of the fluid. In other embodiments, the scraped-off particles drop into the coolant fluid, and then move by gravity to the bottom of the conveyor housing. Even where the agglomerated particles pass through the coolant fluid, the agglomerated condition of the particles is effective to keep together a sufficient mass of the particles, even smaller-size particles, that the mass remains generally sufficiently intact to respond to gravity and effectively reach the bottom of the conveyor housing, and remain at the bottom of the housing so as to be pushed along the length of the housing toward discharge locus 32.

Drum 100 can be made of any material which can provide the desired level of magnetic flux. The drum is shunted so as to reduce the magnetic field on the sides of the drum so that metal particles are not, in general, picked up on the side of the drum. The field of the magnetic flux is designed to have an effective reach of about 1 inch to about 1.5 inches, thereby to pick up metal particles in the dirty coolant fluid from a distance of about 1 inch to about 1.5 inches. It will be understood by those of skill in the art that the "reach" of the magnetic drum varies with the size of the particle which may be affected by the magnetic field. However, in general, particles which are picked up by the drum are picked up within a distance of about 1 inch to about 1.5 inches from the drum.

Given the reach of the magnetic field, the drum is spaced above scraper conveyor 104 a distance suitable that the range of pick-up drum attracts to the drum a substantial portion of the particles which pass into the space between the drum and the conveyor, without drawing any substantial quantity of particles which are already being scraped along the bottom of the tank by conveyor 104. Namely, the drum collects a substantial fraction of the fines and chips in the coolant liquid, but does not pull away those chips which are already being pushed along the bottom of the housing by scraper blades 84.

A typical drum can be made, for example, using a ceramic magnetic core, covered by a stainless steel shell. Other materials can be used as appropriate to the particulate material being attracted to the drum, and the fluid being cleaned.

Drum 100 is sized and located such that a lower portion of the drum runs in the e.g. coolant fluid while the upper portion of the drum is out of the fluid. For example, in the embodiments illustrated, for treating coolant fluid from a machining operation, drum diameter can be on the order of 200 mm to about 300 mm. Such sizing and location, however, are exemplary only. Given the above disclosure, one of ordinary skill in the art can now specify the size and materials of drums for a wide variety of fluid cleaning processes.

By using drum 100 in combination with filter disk assemblies 12, 78, a certain fraction of the particles which would otherwise be removed by screens 52 are removed before the fluid reaches screens 52, whereby the loading of the screens is reduced. This reduced loading of the screens means that the screens are more readily maintained in a generally clean condition by the spray from nozzles 70.

Looking at overall operation of the system, a first fraction of the particles in the incoming dirty fluid goes by gravity to the bottom of the tank and is picked up by scrapers 84 and pushed to chip exit 32.

A second fraction of the particles is picked up on the magnetic drum. While choosing to not be bound by theory, the inventor believes that the agglomeration of particles on the blade develops generally as follows. As the particles are picked up, a certain amount of the fluid remains attached to the particles as by e.g. surface tension. As the particles interact with each other as they are scraped off by blade 128, the coating liquid on one particle is attracted, again by surface tension or a related phenomenon, to the coating liquid on another particle. And so the attraction proceeds, particle-by-particle, in the building up of the agglomerates.

The remaining e.g. third fraction of the particles is collected on screens 52, and blown off of screens 52 by wash nozzles 70. Note from FIG. 10 that drum 100 is positioned relative to screens 52 and nozzles 70 such that the backwash spray/blast of cleaning fluid from nozzles 70 blows the particles, which are being cleaned from screens 52, generally in the direction of the cylindrical collecting surface of drum 100 whereby a substantial fraction of the particles which are so dislodged from the screen become deposited on the cylindrical collecting surface of drum 100.

Still looking to the overall operation of the fluid-cleaning system with magnetic drum 100, the pick-up of particulate material from the dirty liquid, by drum 100, reduces the particulate load which must be picked up by discs 12, 78. Since the pick-up load is reduced, the step of cleaning the screens is facilitated; the tendency of screens 52 to become clogged with particulate matter is reduced, thereby increasing effectiveness of the backwash step.

Further, since the pick-up load at screens 52 is reduced, in some instances a finer mesh screen 52 can be used without unacceptable rates of plugging, clogging, than would be possible in an otherwise similar system where no magnetic drum is used.

While a single magnetic drum has been illustrated, certainly multiple drums can be employed, e.g. spaced along the length of the dirty-fluid tank, and wherein each such magnetic drum discharges its blade scrapings to an exit conveyance.

Figure 12:
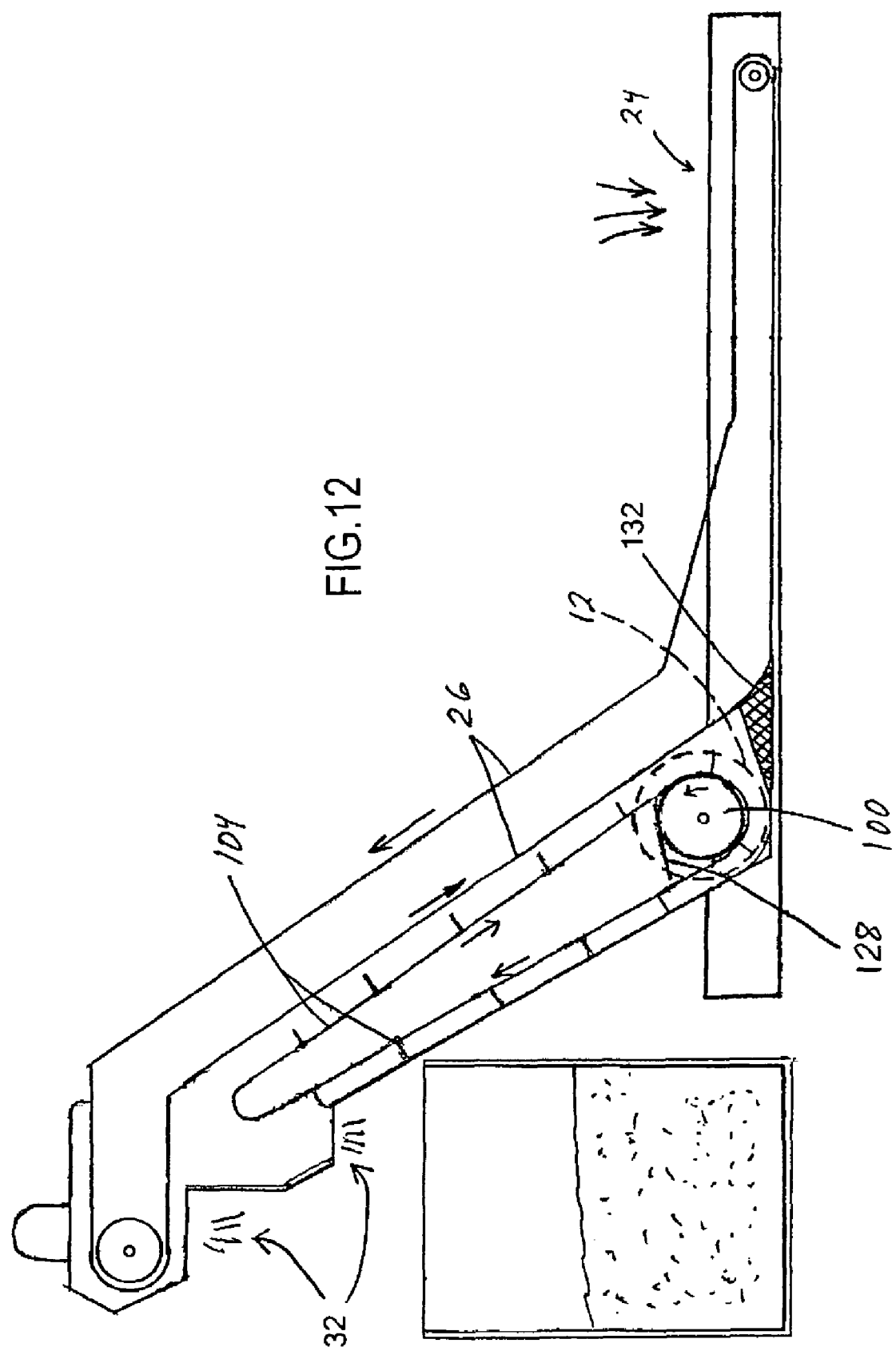
FIG. 12 shows another embodiment of fluid cleaning apparatus of the invention, employing a hinge belt conveyor, a scraper conveyor, a magnetic drum, and disc filters.

In yet another embodiment illustrated generally in FIG. 12, a magnetic drum 100 with blade 128, and disc filter assemblies 12, 78, are disposed adjacent the lower end of the inclined portion of housing 20. A scraper conveyor 104 extends around drum 100 and thence upwardly along the inclined portion of the housing to the chip discharge opening. A hinge belt conveyor 26 runs the full length of housing 20. Along the inclined portion of housing 20, hinge belt conveyor 26 rides above scraper conveyor 104. The downcoming portion of conveyor 26 clears drum 100 and conveyor 104, and extends thence downwardly into the dirty fluid pool along a correspondingly contoured bottom surface portion 132 of the housing. Hinge belt conveyor 26 thus scrapes clean the bottom of housing 20 along the horizontal portion of the length of the housing. Conveyor 26 reverses direction at the lower closed end of housing 20 and traverses, on its upward run, under the incoming stream of dirty fluid, whereby a first increment of particles is separated from the dirty fluid which thus impinges on the top of conveyor 26. Additional particles settle to the bottom of the horizontal portion of housing 20 and are pushed up and moved/carried by cleats and blades on conveyor 26, eventually carrying such particles, on the upper portion of the conveyor 26 run, to chip discharge 32. Contoured bottom surface 132 underlies the lower, turning portion of conveyor 104 adjacent drum 100, as well as underlying the transitioning portion of conveyor 26 as conveyor 26 transitions from a down-coming direction to a horizontal direction. Thus, the contoured bottom surface conforms the bottom inner surface of housing 20 to the general paths traversed by conveyors 26 and 104, thus to avoid a build-up of particulate matter in the cross-sectional space blocked off by the surface contours. Such blocked-off space is shown by cross-hatching in FIG. 12.

Since fluid flow in housing 20 is from inlet 24 toward discharge at disc filter assemblies 12, 78, the direction of flow of the fluid is toward drum 100.

Scraper conveyor 104 travels in a direction wherein the upper flight of the conveyor is traveling toward drum 100 and the lower flight of the conveyor travels from drum 100 toward chip discharge 32.

Particles picked up by magnetic drum 100 are scraped off by blade 128, and fall off the back of the blade or other structure, onto the bottom panel of the inclined portion of housing 20. Downwardly-extending scrapers on scraper conveyor 104 scrape the bottom panel of housing 20 thus picking up the agglomerate material particles which fall from the back of blade 128, and push/carry the respective material to chip discharge 32.

Drum 100 can, of course, be used without filter disk assemblies 12, 78, as a supplement to other known fluid cleaning technologies, so long as such other technologies provide for ultimate escape of the magnetically attracted materials from blade 128, out of the cleaning system to e.g. a chip bin. For example, magnetic drum 100 can be used in combination with a filter drum, so long as an exit path is provided for both the material picked up by the magnetic drum and the material picked up by the filter drum, such that the material from each drum has a movement path which ultimately reaches bin 34, or a separate, second bin.

Further, one or more magnetic drums 100 can be used in combination with a scraper conveyor, and without either of filter disc assemblies 12, 78, without any drum filters, whereby the scraper conveyor and the magnetic drum provide the sole substantive activities for removing particulate material from the dirty coolant fluid.

In an exemplary embodiment, whether with or without filter discs, with or without a drum filter, speed of rotation of magnetic drum 100 is about 4 rpm to about 5 rpm. The speed of rotation can be readily controlled to whatever speed is needed, according to the specific facts of a given implementation, by selecting the diameters of respective sprockets 106, 108, 120, and 122.

Although many of the exemplary embodiments described herein are directed to the practice of the invention in a coolant fluid cleaning apparatus or system for a machine tool, the inventor contemplates many other applications of the invention in other types of fluid filtering systems. Specifically, the invention contemplates other applications which might include, but not be limited to, water filtration equipment, filtering of water used with automatic floor cleaning or street sweeping materials, and filtering of fluids used in combination with cut-off saws, grinding machines, and fluid jet cutters, as well as all manner of other metal-working tools and equipment.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A fluid cleaning system, comprising:
   (a) a dirty fluid receptacle having a bottom, defining a inner surface, and a fluid fill height, said dirty fluid receptacle being adapted and configured to receive and contain a pool of dirty fluid to be cleaned;
   (b) a rotating magnetic structure, and a magnetic field emanating from said magnetic structure, said magnetic structure being mounted relative to said fluid receptacle such that a lower portion of said magnetic structure extends below the fluid fill height and an upper portion of said magnetic structure extends above the fluid fill height, and wherein given portions of an outer surface of said magnetic structure rotate below and above the fluid fill height, and pick up and separate particulate material from such fluid, thereby to clean such fluid; and
   (c) discharge structure adapted to remove such particulate material from said magnetic structure, and to convey such particulate material away from said magnetic structure toward a particulate discharge locus of said fluid cleaning system, said discharge structure further comprising a scraper conveyor, elements of said scraper conveyor traversing said dirty fluid receptacle, and scraping particles from the bottom inner surface of said dirty fluid receptacle and moving such particles toward the particle discharge locus.

2. A fluid cleaning system as in claim 1, further comprising a rotating filter mounted relative to said fluid receptacle such that a lower portion of said rotating filter extends below the fluid fill height and picks up and separates particulate material from the same such pool of fluid as said rotating magnetic structure picks up particulate material from.

3. A fluid cleaning system as in claim 2 wherein said rotating filter comprises a rotating drum filter.

4. A fluid cleaning system as in claim 2, wherein said rotating filter comprises a rotating disc filter.

5. A fluid cleaning system as in claim 4, said rotating disc filter being positioned between said dirty fluid receptacle and a clean fluid receptacle and wherein such fluid passes through said rotating disc filter in traversing from said dirty fluid receptacle to said clean fluid receptacle.

6. A fluid cleaning system as in claim 5 wherein said rotating disc filter is positioned in a side wall of said dirty fluid receptacle such that fluid passes through said rotating disc filter in the process of passing from said dirty fluid receptacle to said clean fluid receptacle.

7. A fluid cleaning system as in claim 2
wherein a first fraction of such particulate material in such dirty fluid settles to a bottom of said dirty fluid receptacle and is picked up by said scraper conveyor from the bottom of said dirty fluid receptacle,
wherein a second fraction of such particulate material is attracted from such dirty fluid to said rotating magnetic structure, and
wherein a third fraction of such particulate material is collected from such dirty fluid by said rotating filter.

8. A fluid cleaning system as in claim 7, further comprising cleaning nozzles positioned to blow particulate material, picked up by said rotating filter, toward said magnetic structure such that a substantial portion of such particulate material displaced from said rotating filter goes directly to said rotating magnetic structure.

9. A fluid cleaning system as in claim 8 wherein said rotating magnetic structure comprises a magnetic drum.

10. A fluid cleaning system as in claim 8 wherein said traversing discharge structure moves such particulate material from said rotating magnetic structure toward the particle discharge locus without such particulate material returning to such pool of fluid.

11. A liquid-using apparatus, comprising a fluid cleaning system as in claim 7.

12. A fluid cleaning system as in claim 7 wherein the second fraction of such particles in a given volume of such fluid is collected by said magnetic structure generally before the fluid reaches said filter.

13. A fluid cleaning system, comprising:
(a) a dirty fluid receptacle having a bottom inner surface, a fluid fill height, said dirty fluid receptacle being adapted and configured to receive and contain a dirty fluid to be cleaned;
(b) a rotating magnetic structure, and a magnetic field emanating from said magnetic structure, said magnetic structure being mounted relative to said fluid receptacle such that a lower portion of said magnetic structure extends below the fluid fill height and an upper portion of said magnetic structure extends above the fluid fill height, and wherein given portions of an outer surface of said magnetic structure rotate below and above the fluid fill height, and pick up and separate particulate material from such fluid, thereby to clean such fluid;
(c) discharge structure adapted to remove such particulate material from said magnetic structure, and to convey such particulate material away from said magnetic structure toward a particulate discharge locus of said fluid cleaning system; and
(d) a rotating filter mounted relative to said fluid receptacle such that a lower portion of said rotating filter extends below the fluid fill height and picks up and separates particulate material from the same such pool of fluid as said rotating magnetic structure picks up particulate material from, so as to remove, by filtration, particulate material in such fluid.

14. A fluid cleaning system as in claim 1 wherein said rotating magnetic structure comprises a magnetic drum.

15. A fluid cleaning system as in claim 1 wherein said scraper conveyor comprises a hinge belt conveyor.

16. A fluid cleaning system as in claim 1, said scraper conveyor comprising a first scraper conveyor (26) traversing a first path in said fluid cleaning system, and further comprising a second scraper conveyor or (104) traversing a second different path in said fluid cleaning system.

17. A fluid cleaning system as in claim 16, wherein the bottom inner surface of said dirty fluid receptacle comprises a contoured bottom surface (132) which conforms the inner surface of said dirty fluid receptacle generally to paths traversed by said first scraper conveyor (26) and said second scraper conveyor (104) adjacent the bottom inner surface.

18. A fluid cleaning system as in claim 1 wherein said discharge structure comprises a cleaning blade having a leading edge bearing against said rotating magnetic structure, and a trailing edge, the leading edge being effective to remove such particulate material from said magnetic structure, and to convey such particulate material radially away from said rotating magnetic structure, and wherein such particulate material drops off the trailing edge of said cleaning blade and is picked up by said scraper conveyor.

19. A fluid cleaning system as in claim 1, the trailing edge of said cleaning blade being disposed above and toward the discharge locus from a pool of such fluid defined at said fill height, and wherein elements of said scraper conveyor pick up such dropped particulate material and move, with such picked up particulate material, toward the particle discharge locus.

20. A liquid-using apparatus, comprising a fluid cleaning system as in claim 1.

21. A fluid cleaning system as in claim 13, said magnetic structure being positioned, relative to said rotating filter such that said magnetic structure removes particles from such dirty fluid before such dirty fluid reaches said rotary filter.

22. A fluid cleaning system as in claim 21 wherein said rotating filter comprises a rotating disc filter.

23. A fluid cleaning system as in claim 22, further comprising a clean fluid receptacle, said rotating disc filter being positioned between said dirty fluid receptacle and a clean fluid receptacle and wherein such fluid passes through said rotating disc filter in traversing from said dirty fluid receptacle to said clean fluid receptacle.

24. A fluid cleaning system as in claim 23 wherein said rotating disc filter is positioned in a side wall of said dirty fluid receptacle such that fluid passes through said rotating disc filter in the process of passing from said dirty fluid receptacle to said clean fluid receptacle.

25. A fluid cleaning system as in claim 21 wherein said rotating filter comprises a rotating drum filter.

26. A fluid cleaning system as in claim 21, further comprising cleaning nozzles positioned to blow particulate material, picked up by said rotating filter, toward said magnetic structure such that a substantial portion of such particulate material so displaced from said rotating filter goes directly to said rotating magnetic structure without falling into such fluid.

27. A fluid cleaning system as in claim 26 wherein said rotating magnetic structure comprises a magnetic drum.

28. A fluid cleaning system as in claim 21 wherein said rotating magnetic structure comprises a magnetic drum.

29. A fluid cleaning system as in claim 21 wherein said discharge structure is adapted and configured to convey such particulate material out of said fluid cleaning system without such particulate material returning to such pool of fluid.

30. A fluid cleaning system as in claim 29 wherein said discharge structure comprises a cleaning blade, having a leading edge bearing against said rotating magnetic structure, and a trailing edge, the leading edge being effective to scrape such particulate material from said magnetic structure, and to convey such particulate material radially away from said rotating magnetic structure, and wherein such particulate material drops off the trailing edge of said cleaning blade.

31. A fluid cleaning system as in claim 30, said cleaning and discharge structure further comprising conveyance structure positioned under the trailing edge of said cleaning blade, displaced from a pool of such fluid defined at said fill height.

32. A liquid-using apparatus, comprising a fluid cleaning system as in claim 30.

33. A fluid cleaning system as in claim 21 wherein said discharge structure comprises a scraper conveyor which is adapted to traverse said dirty fluid receptacle and to scrape particles from the bottom inner surface of said dirty fluid receptacle.

34. A fluid cleaning system as in claim 21 wherein said cleaning and discharge structure comprises a hinge belt conveyor.

35. A fluid cleaning system as in claim 21 wherein said cleaning and discharge structure comprises a first scraper conveyor (26) traversing a first path in said fluid cleaning system, and a second scraper conveyor (104) traversing a second different path in said fluid cleaning system.

36. A fluid cleaning system as in claim 35, said dirty fluid receptacle having a bottom inner surface, and wherein the inner surface of said dirty fluid receptacle comprises a contoured bottom surface (132) which conforms the inner surface of said bottom wall generally to the paths traversed by said first scraper conveyor (26) and said second scraper conveyor (104) adjacent said contoured bottom surface.

37. A liquid-using apparatus, comprising a fluid cleaning system as in claim 21.

38. A fluid cleaning system, comprising:
(a) a dirty fluid receptacle having a length, a bottom inner surface, and a fluid fill height, said dirty fluid receptacle being adapted and configured to receive and contain a pool of dirty fluid to be cleaned;
(b) first (26) and second (104) conveyors, comprising discharge structure which is collectively adapted to engage particulate material which is moving downwardly by gravity toward the bottom inner surface of said dirty fluid receptacle, and/or which has reached the bottom inner surface of said dirty fluid receptacle and to move such engaged particulate material toward a discharge locus of said dirty fluid receptacle; and
(c) particle collection structure adapted to collect particulate material which is in such dirty fluid so as to remove such particulate material from such dirty fluid, to produce a cleaned fluid downstream of said particle collection structure.

39. A liquid-using apparatus comprising a fluid cleaning system as in claim 38.

40. A fluid cleaning system as in claim 38 wherein said particle collection structure comprises a magnetic structure.

41. A fluid cleaning system as in claim 38 wherein said particle collection structure comprises a filtration structure.

42. A fluid cleaning system as in claim 41, said particle collection structure further comprising a rotating magnetic structure, said magnetic structure being mounted relative to said dirty fluid receptacle such that a lower portion of said magnetic structure extends below the fluid fill height and an upper portion of said magnetic structure extends above the fluid fill height.

43. A fluid cleaning system as in claim 42, further comprising a cleaning blade (128) removing such particulate material from said rotating magnetic structure such particulate material dropping toward the bottom inner surface of said dirty fluid receptacle, and a travelling scraper conveyor engaging such dropped particulate material and moving such particulate material toward a discharge locus of said fluid cleaning system.

44. A fluid cleaning system as in claim 42, further comprising a cleaning blade, having a leading edge bearing against said rotating magnetic structure, and a trailing edge, the leading edge being effective to remove particulate material from said magnetic structure, said cleaning blade being effective to convey such particulate material away from said rotating magnetic structure, and wherein such particulate material drops off the trailing edge of said cleaning blade, at least one of said first and second scraper conveyors engaging such particulate material under the trailing edge of said cleaning blade and moving such dropped particulate material toward a discharge locus of said fluid cleaning system.

45. A fluid cleaning system as in claim 42, further comprising a cleaning blade, having a leading edge bearing against said rotating magnetic structure, and a trailing edge, the leading edge being effective to remove particulate material from said magnetic structure, said cleaning blade being effective to convey such particulate material away from said rotating magnetic structure, at least one of said first and second scraper conveyors being positioned under the trailing edge of said cleaning blade, displaced from a pool of such fluid defined at said fill height.

46. A liquid-using apparatus comprising a fluid cleaning system as in claim 43.

47. A fluid cleaning system as in claim 41, further comprising a clean fluid receptacle (36) adapted, configured, and juxtaposed to receive such cleaned fluid from said dirty fluid receptacle, as a source receptacle, wherein said filtration structure comprises a rotating filter positioned between the respective source receptacle and a downstream receptacle, and wherein such fluid passes through said rotating filter in traversing from said source receptacle to said downstream receptacle.

48. A method of cleaning a dirty fluid, comprising:
(a) collecting a pool of the dirty fluid in a dirty fluid receptacle;
(b) rotating a magnetic structure mounted relative to said dirty fluid receptacle, and in the pool of dirty fluid such that portions of an outer surface of the magnetic structure rotate below and above the pool of dirty fluid, and pick up and separate particulate material from the dirty fluid;

(c) removing the picked-up particulate material from the outer surface of the magnetic structure and conveying the picked-up particulate material out of, and away from, the dirty fluid receptacle; and (d) passing fluid out of the dirty fluid receptacle through a rotating filter.

49. A method as in claim 48, further comprising passing the fluid out of the dirty fluid receptacle, through the rotating filter, to a clean fluid receptacle.

50. A method as in claim 48, further comprising blowing particulate material picked up by the rotating filter back toward the rotating magnetic structure such that a substantial portion of such particulate material so displaced from the rotating filter goes directly to the rotating magnetic structure without falling into the pool of dirty fluid.

51. A method of cleaning a dirty fluid, comprising:

(a) collecting a pool of dirty fluid in a dirty fluid receptacle having bottom inner surface, and a discharge locus;

(b) picking up and separating particulate material from the dirty fluid on at least one of
  (i) a rotating magnetic structure, and
  (ii) a rotating filter;

(c) dropping the picked up particulate material toward the bottom inner surface of the dirty fluid receptacle; and (d) scraping the so-dropped particulate material toward the discharge locus of the dirty fluid receptacle.

52. A method as in claim 51, the method further comprising picking up and separating particulate material from the dirty fluid on both a rotating magnetic structure and a rotating filter.

53. A method as in claim 52 comprising removing a portion of the particulate material from a given volume of the dirty fluid, using the rotating magnetic structure, before such dirty fluid reaches the rotating filter.

* * * * *

UNITED STATES PATENT AND TRADEMARK OFFICE
CERTIFICATE OF CORRECTION

PATENT NO. : 7,638,061 B2  Page 1 of 1
APPLICATION NO. : 11/220188
DATED : December 29, 2009
INVENTOR(S) : Robin C. Moore It is certified that error appears in the above-identified patent and that said Letters Patent is hereby corrected as shown below:

Title Page, Item (56) References Cited, under FOREIGN PATENT DOCUMENTS, add
--WO 9213626 (A1) 8/1992--

Signed and Sealed this
Twentieth Day of March, 2012

David J. Kappos
*Director of the United States Patent and Trademark Office*